United States Patent [19]
Tsai et al.

[11] Patent Number: 5,499,147
[45] Date of Patent: Mar. 12, 1996

[54] ROTARY HEAD RECORDING AND REPRODUCTION APPARATUS WITH MEMORY AND METHOD OF OPERATION WHICH COMPARES A REPRODUCED SIGNAL WITH AN ORIGINAL SIGNAL

[75] Inventors: Jang-Zern Tsai, Ma Dow Town; Chin-Chuan Liang, Taichung, both of Taiwan

[73] Assignee: Industrial Technology Research Institute, Hsinchu, Taiwan

[21] Appl. No.: 161,283

[22] Filed: Dec. 2, 1993

[51] Int. Cl.$^6$ .............. G11B 5/09; G11B 15/14; G11C 29/00; G06F 11/00
[52] U.S. Cl. .............. 360/53; 360/64; 360/381; 360/31; 371/21.2; 371/25.1; 395/181
[58] Field of Search ............... 360/53, 18, 48, 360/38.1, 22, 32, 31, 64; 371/25.1, 71, 21.2, 13, 40.1; 365/49

[56] References Cited

U.S. PATENT DOCUMENTS

| | | | |
|---|---|---|---|
| 3,774,154 | 11/1973 | Devorg et al. | 360/53 X |
| 4,415,938 | 11/1983 | Heitmann | 360/53 |
| 4,637,023 | 1/1987 | Lounsbury et al. | 371/13 |
| 4,685,004 | 8/1987 | Takahashi et al. | 360/32 |
| 4,837,641 | 6/1989 | Mori et al. | 360/32 |
| 4,841,390 | 6/1989 | Yokosawa | 360/77.14 |
| 5,122,913 | 6/1992 | Yamamoto | 360/53 |
| 5,124,851 | 6/1992 | Masui et al. | 360/53 |
| 5,128,946 | 7/1992 | Ogino et al. | 360/53 X |
| 5,267,100 | 11/1993 | Ichijo et al. | 360/53 |
| 5,301,141 | 4/1994 | Traylor | 365/49 |
| 5,319,504 | 6/1994 | Shih | 360/53 |
| 5,343,334 | 8/1994 | Kaminaga et al. | 360/38.1 |

FOREIGN PATENT DOCUMENTS

| | | |
|---|---|---|
| 0272130 | 12/1987 | European Pat. Off. . |
| 0297809 | 6/1988 | European Pat. Off. . |
| 0314456 | 10/1988 | European Pat. Off. . |
| 59-231713 | 12/1984 | Japan . |

OTHER PUBLICATIONS

K. Odaka, E. Tan & B. Vermeulen, "Designing a Data Storage Format for Digital Audio Tape (DAT)", rev. B, Oct., 1988.

The DAT Conference, The DAT Conference Standard, Mar., 1988.

*Primary Examiner*—Aristotelis Psitos
*Assistant Examiner*—Patrick Wamsley
*Attorney, Agent, or Firm*—Meltzer, Lippe, Goldstein, et al.

[57] ABSTRACT

A method and tape recorder apparatus are disclosed for recording a signal on a tape. The tape recorder apparatus is provided with a memory for storing a signal to be recorded on a tape. The tape recorder apparatus has a recording head for recording the signal stored in the memory. The tape recorder apparatus also has a playback head for reproducing the signal recorded by the recording head on the tape. Furthermore, the tape recorder apparatus has a comparison circuit for comparing the signal reproduced by the playback head with the signal stored in the memory. Depending on errors identified by the comparison circuit in the reproduced signal, the signal in the memory is re-recorded on the tape.

19 Claims, 13 Drawing Sheets

| FIG 4A-1 | FIG 4A-2 |

FIG. 4A-1
(PRIOR ART)

BLOCK ADDRESS

| | 0 | 1 | 2 | 3 | 35 | 50 | 51 | 52 |
|---|---|---|---|---|---|---|---|---|
| 0 | A 0U | A 832U | A 2U | A 834U | A 866U | A 50U | A 882U | Q 52. 0 |
| 1 | A 52U | A 884U | A 54U | A 886U | A 918U | A 102U | A 934U | Q 52. 1 |
| 2 | A 01 | A 8321 | A 21 | A 8341 | A 8661 | A 501 | A 8821 | Q 52. 2 |
| 3 | A 521 | A 8841 | A 541 | A 8861 | A 9181 | A 1021 | A 9341 | Q 52. 3 |
| 4 | A 104U | A 936U | A 106U | A 938U | A 978U | A 154U | A 986U | Q 52. 4 |
| 5 | A 156U | A 988U | A 158U | A 990U | A1022U | A 206U | A1038U | Q 52. 5 |
| 6 | A 1041 | A 9361 | A 1061 | A 9381 | A 9781 | A 1541 | A 9861 | Q 52. 6 |
| 7 | A 1561 | A 9881 | A 1581 | A 9901 | A10221 | A 2061 | A10381 | Q 52. 7 |
| 8 | A 208U | A1040U | A 210U | A1042U | A1074U | A 258U | A1090U | Q 52. 8 |
| 9 | A 260U | A1092U | A 262U | A1094U | A1126U | A 310U | A1142U | Q 52. 9 |
| 10 | A 2081 | A10401 | A 2101 | A10421 | A10741 | A 2581 | A10901 | Q 52.10 |
| 11 | A 2601 | A10921 | A 2621 | A10941 | A11261 | A 3101 | A11421 | Q 52.11 |
| 12 | A 312U | A1144U | A 314U | A1146U | A1178U | A 362U | A1194U | Q 52.12 |
| 13 | A 364U | A1196U | A 366U | A1198U | A1230U | A 414U | A1246U | Q 52.13 |
| 14 | A 3121 | A11441 | A 3141 | A11461 | A11781 | A 3621 | A11941 | Q 52.14 |
| 15 | A 3641 | A11961 | A 3661 | A11981 | A12301 | A 4141 | A12461 | Q 52.15 |
| 16 | A 416U | A1248U | A 418U | A1250U | A1282U | A 466U | A1298U | Q 52.16 |
| 17 | A 468U | A1300U | A 470U | A1302U | A1334U | A 518U | A1350U | Q 52.17 |
| 18 | A 4161 | A12481 | A 4181 | A12501 | A12821 | A 4661 | A12981 | Q 52.18 |
| 19 | A 4681 | A13001 | A 4701 | A13021 | A13341 | A 5181 | A13501 | Q 52.19 |
| 20 | A 520U | A1352U | A 522U | A1354U | A1386U | A 570U | A1402U | Q 52.20 |
| 21 | A 572U | A1404U | A 574U | A1406U | A1438U | A 622U |  | Q 52.21 |
| 22 | A 5201 | A13521 | A 5221 | A13541 | A13861 | A 5701 | A14021 | Q 52.22 |
| 23 | A 5721 | A14041 | A 5741 | A14061 | A14381 | A 6221 |  | Q 52.23 |
| 24 | A 624U | P 1.24 | A 626U | P 3.24 | P 35.24 | A 674U | P 51.24 | Q 52.24 |
| 25 | A 676U | P 1.25 | A 678U | P 3.25 | P 35.25 | A 726U | P 51.25 | Q 52.25 |
| 26 | A 6241 | P 1.26 | A 6261 | P 3.26 | P 35.26 | A 6741 | P 51.26 | Q 52.26 |
| 27 | A 6761 | P 1.27 | A 6781 | P 3.27 | P 35.27 | A 7261 | P 51.27 | Q 52.27 |
| 28 | A 728U | P 1.28 | A 730U | P 3.28 | P 35.28 | A 778U | P 51.28 | Q 52.28 |
| 29 | A 780U | P 1.29 | A 782U | P 3.29 | P 35.29 | A 830U | P 51.29 | Q 52.29 |
| 30 | A 7281 | P 1.30 | A 7301 | P 3.30 | P 35.30 | A 7781 | P 51.30 | Q 52.30 |
| 31 | A 7801 | P 1.31 | A 7821 | P 3.31 | P 35.31 | A 8301 | P 51.31 | Q 52.31 |

RECORDING DIRECTION

SYMBOL NUMBER

FIG. 4A-2
(PRIOR ART)

| | 75 | 76 | 77 | 78 | 79 | 111 | 126 | 127 |
|---|---|---|---|---|---|---|---|---|
| | Q 75. 0 | B 1U | B 833U | B 3U | B 835U | B 867U | B 51U | B 883U |
| | Q 75. 1 | B 53U | B 885U | B 55U | B 887U | B 919U | B 103U | B 935U |
| | Q 75. 2 | B 1I | B 833I | B 3I | B 835I | B 867I | B 51I | B 883I |
| | Q 75. 3 | B 53I | B 885I | B 55I | B 887I | B 919I | B 103I | B 935I |
| | Q 75. 4 | B 105U | B 937U | B 107U | B 939U | B 971U | B 155U | B 987U |
| | Q 75. 5 | B 157U | B 989U | B 159U | B 991U | B1023U | B 207U | B1039U |
| | Q 75. 6 | B 105I | B 937I | B 107I | B 939I | B 971I | B 155I | B 987I |
| | Q 75. 7 | B 157I | B 989I | B 159I | B 991I | B1023I | B 207I | B1039I |
| | Q 75. 8 | B 209U | B1041U | B 211U | B1043U | B1075U | B 259U | B1091U |
| | Q 75. 9 | B 261U | B1093U | B 263U | B1095U | B1127U | B 311U | B1143U |
| | Q 75.10 | B 209I | B1041I | B 211I | B1043I | B1075I | B 259I | B1091I |
| | Q 75.11 | B 261I | B1093I | B 263I | B1095I | B1127I | B 311I | B1143I |
| | Q 75.12 | B 313U | B1145U | B 315U | B1147U | B1179U | B 363U | B1195U |
| | Q 75.13 | B 365U | B1197U | B 367U | B1199U | B1231U | B 415U | B1247U |
| | Q 75.14 | B 313I | B1145I | B 315I | B1147I | B1179I | B 363I | B1195I |
| | Q 75.15 | B 365I | B1197I | B 367I | B1199I | B1231I | B 415I | B1247I |
| | Q 75.16 | B 417U | B1249U | B 419U | B1251U | B1283U | B 467U | B1299U |
| | Q 75.17 | B 469U | B1301U | B 471U | B1303U | B1335U | B 519U | B1351U |
| | Q 75.18 | B 417I | B1249I | B 419I | B1251I | B1283I | B 467I | B1299I |
| | Q 75.19 | B 469I | B1301I | B 471I | B1303I | B1335I | B 519I | B1351I |
| | Q 75.20 | B 521U | B1353U | B 523U | B1355U | B1387U | B 571U | B1403U |
| | Q 75.21 | B 573U | B1405U | B 575U | B1407U | B1439U | B 623U | |
| | Q 75.22 | B 521I | B1353I | B 523I | B1355I | B1387I | B 571I | B1403I |
| | Q 75.23 | B 573I | B1405I | B 575I | B1407I | B1439I | B 623I | |
| | Q 75.24 | B 625U | P 77.24 | B 627U | P 79.24 | P111.24 | B 675U | P127.24 |
| | Q 75.25 | B 677U | P 77.25 | B 679U | P 79.25 | P111.25 | B 727U | P127.25 |
| | Q 75.26 | B 625I | P 77.26 | B 627I | P 79.26 | P111.26 | B 675I | P127.26 |
| | Q 75.27 | B 677I | P 77.27 | B 679I | P 79.27 | P111.27 | B 727I | P127.27 |
| | Q 75.28 | B 729U | P 77.28 | B 731U | P 79.28 | P111.28 | B 779U | P127.28 |
| | Q 75.29 | B 781U | P 77.29 | B 783U | P 79.29 | P111.29 | B 831U | P127.29 |
| | Q 75.30 | B 729I | P 77.30 | B 731I | P 79.30 | P111.30 | B 779I | P127.30 |
| | Q 75.31 | B 781I | P 77.31 | B 783I | P 79.31 | P111.31 | B 831I | P127.31 |

FIG. 4B

| FIG 4B-1 | FIG 4B-2 |
|---|---|

FIG. 4B-1
(PRIOR ART)

RECORDING DIRECTION →
SYMBOL NUMBER ↓

BLOCK ADDRESS

| | 0 | 1 | 2 | 3 | ~ | 35 | ~ | 50 | 51 | 52 |
|---|---|---|---|---|---|---|---|---|---|---|
| 0 | B 0U | B 832U | B 2U | B 834U | | B 866U | | B 50U | B 882U | Q 52.0 |
| 1 | B 52U | B 884U | B 54U | B 886U | | B 918U | | B 102U | B 934U | Q 52.1 |
| 2 | B 01 | B 8321 | B 21 | B 8341 | | B 8661 | | B 501 | B 8821 | Q 52.2 |
| 3 | B 521 | B 8841 | B 541 | B 8861 | | B 9181 | | B 1021 | B 9341 | Q 52.3 |
| 4 | B 104U | B 936U | B 106U | B 938U | | B 978U | | B 154U | B 986U | Q 52.4 |
| 5 | B 156U | B 988U | B 158U | B 990U | | B1022U | | B 206U | B1038U | Q 52.5 |
| 6 | B 1041 | B 9361 | B 1061 | B 9381 | | B 9781 | | B 1541 | B 9861 | Q 52.6 |
| 7 | B 1561 | B 9881 | B 1581 | B 9901 | | B10221 | | B 2061 | B10381 | Q 52.7 |
| 8 | B 208U | B1040U | B 210U | B1042U | | B1074U | | B 258U | B1090U | Q 52.8 |
| 9 | B 260U | B1092U | B 262U | B1094U | | B1126U | | B 310U | B1142U | Q 52.9 |
| 10 | B 2081 | B10401 | B 2101 | B10421 | | B10741 | | B 2581 | B10901 | Q 52.10 |
| 11 | B 2601 | B10921 | B 2621 | B10941 | | B11261 | | B 3101 | B11421 | Q 52.11 |
| 12 | B 312U | B1144U | B 314U | B1146U | | B1178U | | B 362U | B1194U | Q 52.12 |
| 13 | B 364U | B1196U | B 366U | B1198U | | B1230U | | B 414U | B1246U | Q 52.13 |
| 14 | B 3121 | B11441 | B 3141 | B11461 | | B11781 | | B 3621 | B11941 | Q 52.14 |
| 15 | B 3641 | B11961 | B 3661 | B11981 | | B12301 | | B 4141 | B12461 | Q 52.15 |
| 16 | B 416U | B1248U | B 418U | B1250U | | B1282U | | B 466U | B1298U | Q 52.16 |
| 17 | B 468U | B1300U | B 470U | B1302U | | B1334U | | B 518U | B1350U | Q 52.17 |
| 18 | B 4161 | B12481 | B 4181 | B12501 | | B12821 | | B 4661 | B12981 | Q 52.18 |
| 19 | B 4681 | B13001 | B 4701 | B13021 | | B13341 | | B 5181 | B13501 | Q 52.19 |
| 20 | B 520U | B1352U | B 522U | B1354U | | B1386U | | B 570U | B1402U | Q 52.20 |
| 21 | B 572U | B1404U | B 574U | B1406U | | B1438U | | B 622U | | Q 52.21 |
| 22 | B 5201 | B13521 | B 5221 | B13541 | | B13861 | | B 5701 | B14021 | Q 52.22 |
| 23 | B 5721 | B14041 | B 5741 | B14061 | | B14381 | | B 6221 | | Q 52.23 |
| 24 | B 624U | P 1.24 | B 626U | P 3.24 | | P 35.24 | | B 674U | P 51.24 | Q 52.24 |
| 25 | B 676U | P 1.25 | B 678U | P 3.25 | | P 35.25 | | B 726U | P 51.25 | Q 52.25 |
| 26 | B 6241 | P 1.26 | B 6261 | P 3.26 | | P 35.26 | | B 6741 | P 51.26 | Q 52.26 |
| 27 | B 6761 | P 1.27 | B 6781 | P 3.27 | | P 35.27 | | B 7261 | P 51.27 | Q 52.27 |
| 28 | B 728U | P 1.28 | B 730U | P 3.28 | | P 35.28 | | B 778U | P 51.28 | Q 52.28 |
| 29 | B 780U | P 1.29 | B 782U | P 3.29 | | P 35.29 | | B 830U | P 51.29 | Q 52.29 |
| 30 | B 7281 | P 1.30 | B 7301 | P 3.30 | | P 35.30 | | B 7781 | P 51.30 | Q 52.30 |
| 31 | B 7801 | P 1.31 | B 7821 | P 3.31 | | P 35.31 | | B 8301 | P 51.31 | Q 52.31 |

FIG. 4B-2
(PRIOR ART)

| | 75 | 76 | 77 | 78 | 79 | | 111 | | 126 | 127 |
|---|---|---|---|---|---|---|---|---|---|---|
| | Q 75. 0 | A    1U | A  833U | A    3U | A  835U | | A  867U | | A   51U | A  883U |
| | Q 75. 1 | A   53U | A  885U | A   55U | A  887U | | A  919U | | A  103U | A  935U |
| | Q 75. 2 | A    1l | A  833l | A   3l  | A  835l | | A  867l | | A   51l | A  883l |
| | Q 75. 3 | A   53l | A  885l | A   55l | A  887l | | A  919l | | A  103l | A  935l |
| | Q 75. 4 | A  105U | A  937U | A  107U | A  939U | | A  971U | | A  155U | A  987U |
| | Q 75. 5 | A  157U | A  989U | A  159U | A  991U | | A1023U  | | A  207U | A1039U  |
| | Q 75. 6 | A  105l | A  937l | A  107l | A  939l | | A  971l | | A  155l | A  987l |
| | Q 75. 7 | A  157l | A  989l | A  159l | A  991l | | A1023l  | | A  207l | A1039l  |
| | Q 75. 8 | A  209U | A1041U  | A  211U | A1043U  | | A1075U  | | A  259U | A1091U  |
| | Q 75. 9 | A  261U | A1093U  | A  263U | A1095U  | | A1127U  | | A  311U | A1143U  |
| | Q 75.10 | A  209l | A1041l  | A  211l | A1043l  | | A1075l  | | A  259l | A1091l  |
| | Q 75.11 | A  261l | A1093l  | A  263l | A1095l  | | A1127l  | | A  311l | A1143l  |
| | Q 75.12 | A  313U | A1145U  | A  315U | A1147U  | | A1179U  | | A  363U | A1195U  |
| | Q 75.13 | A  365U | A1197U  | A  367U | A1199U  | | A1231U  | | A  415U | A1247U  |
| | Q 75.14 | A  313l | A1145l  | A  315l | A1147l  | | A1179l  | | A  363l | A1195l  |
| | Q 75.15 | A  365l | A1197l  | A  367l | A1199l  | | A1231l  | | A  415l | A1247l  |
| | Q 75.16 | A  417U | A1249U  | A  419U | A1251U  | | A1283U  | | A  467U | A1299U  |
| | Q 75.17 | A  469U | A1301U  | A  471U | A1303U  | | A1335U  | | A  519U | A1351U  |
| | Q 75.18 | A  417l | A1249l  | A  419l | A1251l  | | A1283l  | | A  467l | A1299l  |
| | Q 75.19 | A  469l | A1301l  | A  471l | A1303l  | | A1335l  | | A  519l | A1351l  |
| | Q 75.20 | A  521U | A1353U  | A  523U | A1355U  | | A1387U  | | A  571U | A1403U  |
| | Q 75.21 | A  573U | A1405U  | A  575U | A1407U  | | A1439U  | | A  623U |         |
| | Q 75.22 | A  521l | A1353l  | A  523l | A1355l  | | A1387l  | | A  571l | A1403l  |
| | Q 75.23 | A  573l | A1405l  | A  575l | A1407l  | | A1439l  | | A  623l |         |
| | Q 75.24 | A  625U | P 77.24 | A  627U | P 79.24 | | P111.24 | | A  675U | P127.24 |
| | Q 75.25 | A  677U | P 77.25 | A  679U | P 79.25 | | P111.25 | | A  727U | P127.25 |
| | Q 75.26 | A  625l | P 77.26 | A  627l | P 79.26 | | P111.26 | | A  675l | P127.26 |
| | Q 75.27 | A  677l | P 77.27 | A  679l | P 79.27 | | P111.27 | | A  727l | P127.27 |
| | Q 75.28 | A  729U | P 77.28 | A  731U | P 79.28 | | P111.28 | | A  779U | P127.28 |
| | Q 75.29 | A  781U | P 77.29 | A  783U | P 79.29 | | P111.29 | | A  831U | P127.29 |
| | Q 75.30 | A  729l | P 77.30 | A  731l | P 79.30 | | P111.30 | | A  779l | P127.30 |
| | Q 75.31 | A  781l | P 77.31 | A  783l | P 79.31 | | P111.31 | | A  831l | P127.31 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| PCM INTERFACE | 3 | | | 4 | | | | 5 | | | | 6 | | | | 7 | | | | 8 | | | | | | | | | | | |
| RAM0 | | | | 4 | | | | | | | | | | | | | | | | 8 | | | | | | | | | | | |
| RAM1 | | | | | | | | 5 | | | | | | | | | | | | | | | | | | | | | | | |
| RAM2 | | | | | | | | | | | | 6 | | | | 7 | | | | | | | | | | | | | | | |
| RAM3 | 2 | | | | | | | | | | | | | | | | | | | | | | 9 | | | 10 | | | 11 | | 12 | |
| ECC | 1 | | | 2 | | | 3 | | | 4 | | | 5 | | | 6 | | | 7 | | | 8 | | | 9 | | | 10 | | 11 | | 12 |
| MOD DEM | | 0 | 1 | | 2 | 3 | | 4 | | 5 | | 6 | | ✗5 | 6 | | ✗5 | 6 | | ✗5 | 6 | 7 | | 8 | 9 | 10 | 11 | | | | | |
| COMPARISON HEAD Ap | An+1 | | An+2 | | An+3 | An+4 | | An+5 | An+6 | An+7 | | An+8 | An+9 | An+10 | An+11 | An+12 | An+13 | An+14 | | | | | | | | | | | | | | |
| HEAD Ar | | | | | | | | | | | | An+8 | An+9 | An+10 | An+11 | An+12 | An+13 | An+14 | | | | | | | | | | | | | | |
| HEAD Bp | Bn+0 | Bn+1 | Bn+2 | Bn+3 | Bn+4 | Bn+5 | Bn+6 | Bn+7 | | Bn+8 | Bn+9 | Bn+10 | Bn+11 | Bn+12 | Bn+13 | Bn+14 | | | | | | | | | | | | | | | | |
| HEAD Br | Bn+1 | Bn+2 | Bn+3 | Bn+4 | Bn+5 | Bn+6 | Bn+7 | Bn+8 | Bn+9 | Bn+10 | Bn+11 | Bn+12 | Bn+13 | Bn+14 | | | | | | | | | | | | | | | | | | |

Ole: 5,499,147

ROTARY HEAD RECORDING AND REPRODUCTION APPARATUS WITH MEMORY AND METHOD OF OPERATION WHICH COMPARES A REPRODUCED SIGNAL WITH AN ORIGINAL SIGNAL

FIELD OF THE INVENTION

The present invention relates to recording and reproducing signals using a tape recorder apparatus. In particular, the present invention relates to a method and system for recording digital signals on a magnetic tape in a fashion that reduces or eliminates the occurrence of drop-in and drop-out errors.

BACKGROUND OF THE INVENTION

A popular tape recorder apparatus for recording audio signals on, and reproducing audio signals from, a magnetic tape is the rotary head digital audio tape (R-DAT) apparatus. The general format of the R-DAT apparatus is described in THE DAT CONFERENCE, THE DAT CONFERENCE STANDARD, Mar., 1988. U.S. Pat. No. 4,841,390 and Japan Patent Doc. 59-231713 also describe R-DAT apparatuses. A R-DAT for use as a data storage device, e.g., in a computer system, has also been proposed by K. Odaka, E. Tan & B. Vermeulen, "Designing a Data Storage Format for Digital Audio Tape (DAT)", rev. B, Oct., 1988. See also European Patent Application Nos. 0 272 130, 0 314 456.

Figure 1:
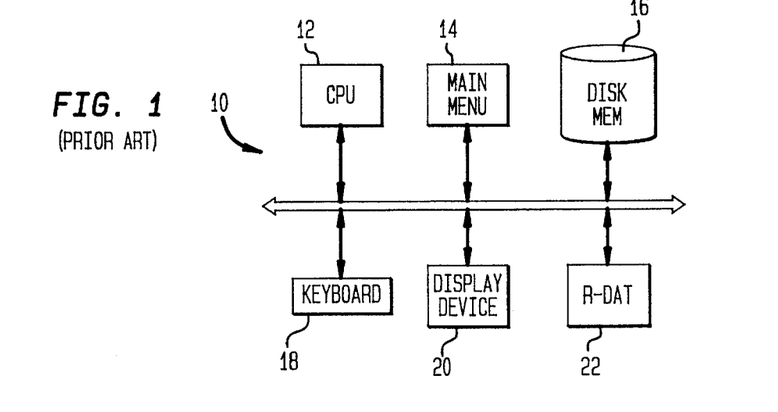
FIG. 1 illustrates a conventional computer system which uses a tape drive for data storage.

FIG. 1 shows a computer system 10 which utilizes a R-DAT 22 for data storage. The computer system 10 has a CPU or processor 12 for executing instructions, a main memory 14 and a disk memory 16 for storing data and instructions, a keyboard 18 for receiving manual input of data and instructions, a display device 20, a R-DAT 22 and a bus 24 for transferring data and instructions between each device. Illustratively, the R-DAT 22 is used as a data streamer, e.g., the R-DAT may be periodically used for archiving or backing up the disk memory 16.

Figure 2:
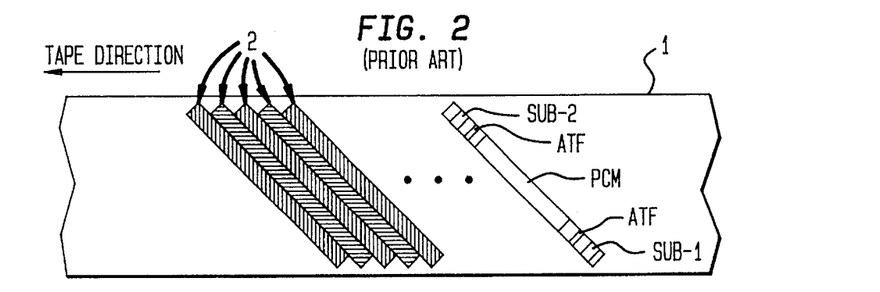
FIG. 2 illustrates the conventional layout of tracks as produced by a rotary head tape recording device.

In a R-DAT, signals are recorded in digital form on a magnetic tape. As shown in FIG. 2, tracks 2 are formed on the magnetic tape 1 obliquely to the longitudinal direction of the tape 1. Typically, the tracks 2 are formed alternately by a pair of recording heads A and B of different azimuth angles. (The heads A and B are positioned 180° from each other on the outer circumference of a rotating drum around which the tape is partially wrapped.) Each pair of "plus-azimuth" and "minus-azimuth" tracks forms a frame. As shown, each track is divided into a PCM area containing one hundred twenty-eight blocks of recorded data, SUB1 and SUB2 data areas containing eight blocks of PACK data each and ATF (automatic track following) areas containing signals used for tracking servo control during playback.

Figure 2A:
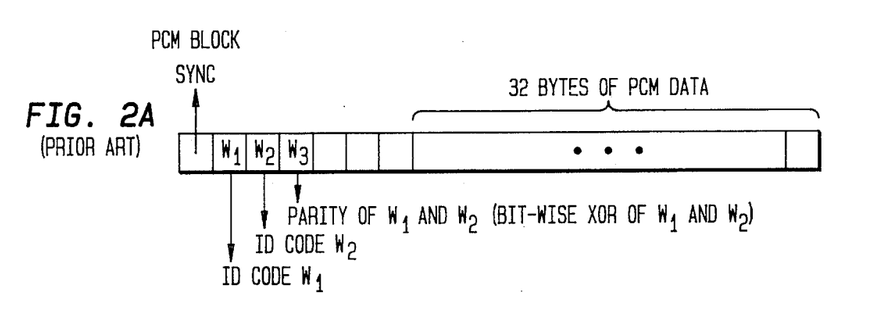
FIG. 2A shows a conventional PCM block structure.
Figure 2B:
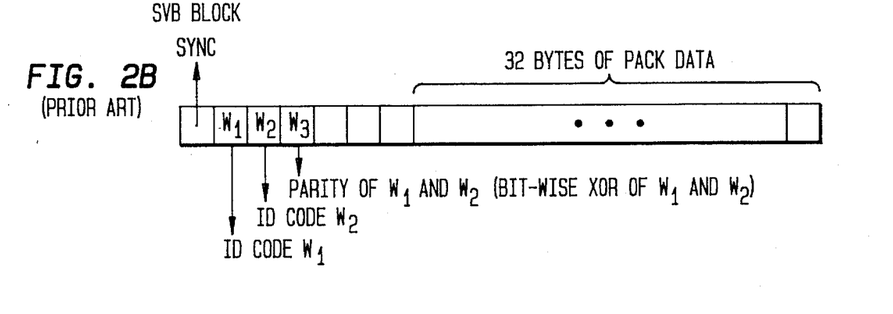
FIG. 2B shows a conventional SUB block structure.

As shown in FIG. 2A, each PCM block includes bytes W1, W2 and W3 where W1 and W2 are block ID codes and where W3 is a parity byte (equal to the bit-wise W1 exclusive-OR W2). Each PCM block also has a sync byte and thirty-two PCM data bytes. Likewise, as shown in FIG. 2B, each SUB block includes bytes W1, W2 and W3 where W1 and W2 are block ID codes and where W3 is a parity byte (equal to the bit-wise W1 exclusive-OR W2). Each SUB block also has a sync byte and thirty-two PACK data bytes.

Figure 3:
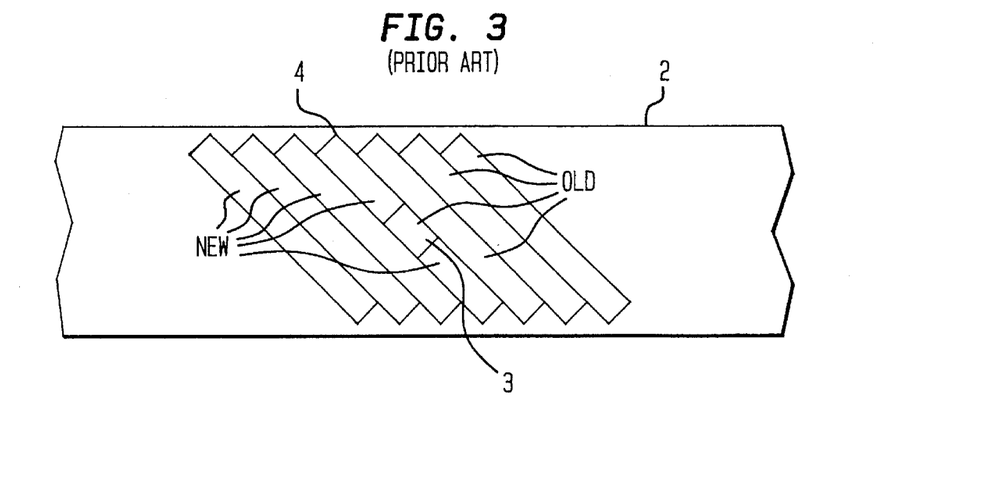
FIG. 3 illustrates how a drop-in error occurs.

The recording of data on, and the reproduction of data from, the magnetic tape 1 is subject to error including drop-out and drop-in errors. A drop-out error occurs when the signal level of data recorded on the tape 1 has degraded such that the data can no longer be reproduced. A drop-in error occurs when an old tape on which old data bytes were previously recorded is used for recording new data. FIG. 3 illustrates how a drop-in error occurs. A conventional R-DAT does not have an erase head. Rather, new data bytes are simply recorded over old data. As shown in FIG. 3, new data bytes are about to be recorded over old data 3 on a track 4. However, because of some event or condition, such as a dust particle being present between the recording head which is about to scan the track 4 for purposes of recording the new data and the tape 1, the new data bytes do not overwrite the old data 3. Thus, the old data bytes 3 remain on the track 4.

A R-DAT for use in recording and reproducing signals provides several error detection and correction mechanisms including:

(a) Interleaving—In ordinary audio recording, the left and right channels of every thirty msec of audio are recorded in a single frame comprising a pair of tracks—a plus-azimuth track and a minus-azimuth track. According to an interleaving scheme, each byte (sample of the left or right channel) within a frame is recorded in the PCM data areas of the tracks of the frame such that adjacent samples are separated from each other as much as possible. FIGS. 4A and 4B show illustrative interleaving formats for the plus-azimuth track and the minus-azimuth track. In FIGS. 4A and 4B, the block Aiu is an upper byte of the ith sample of the left channel, Ail is the lower byte of the ith sample of the left channel, Biu is the upper byte of the ith sample of the right channel and Bil is the lower byte of the ith sample of the right channel. Px,y and Qx,y are parity symbols of error correction codes (ECC) C1(32,28,5) and C2(32,24,7) discussed below.

The interleaving format facilitates the "concealment" operation which reconstructs bytes lost to drop-out or burst errors (an error in which adjacent bytes recorded on a track are lost). In a concealment operation, lost data bytes are reconstructed from one or more nearby recovered data using interpolation, smoothing or holding the previous sample. By dispersing adjacent samples as far away as possible, the likelihood increases that lost data bytes will not be adjacent to each other but instead will be adjacent to reproducible data bytes in the reconstructed signal (which adjacent reproducible data bytes may be used in the concealment operation to recover the lost data bytes).

(b) Parity check—Illustratively, a digital signal to be recorded is divided into a series of eight bit long units which are modulated to produce ten bit long units. The eight bit long units are recorded in thirty-two byte blocks which also include W1 (ID1), W2 (ID2) and W3 (=W1 XOR W2) bytes (described above). When the signal is reproduced from the tape, the eight bit of data are demodulated and a parity check is performed on the entire block using the block ID codes W1 and W2 and the parity check byte W3. That is, the R-DAT verifies for the reproduced bytes W1, W2 and W3 that W3=W1 XOR W2.

(c) Error Correction Codes (ECC)—ECC encoding is performed on PACK and PCM data during the recording process using a Reed Solomon code. In the case that the R-DAT is used for audio, two ECC codes C1 (32,28,5) and C2 (32,26,7) are used. If the R-DAT is used for data storage, a third code C3 is used. The ECC provides for detection and correction of errors provided that the number of errors is within the error detection and error correction capabilities of the ECC codes C1, C2, and C3.

(d) Read after write (RAW)—A R-DAT used for data storage is adapted (as discussed below) to reproduce each track immediately after it is recorded. If the reproduced data bytes contains errors, they are re-recorded on the tape.

As can be appreciated from the above discussion, more error correction and detection capabilities are provided for a R-DAT adapted for data storage than a R-DAT used for audio. The reason is that in audio reproduction, errors not corrected or detected using the above mechanisms can be alleviated using a concealment operation. This is not possible in the case of data storage where absolutely accurate data reproduction is critical.

Figure 5:
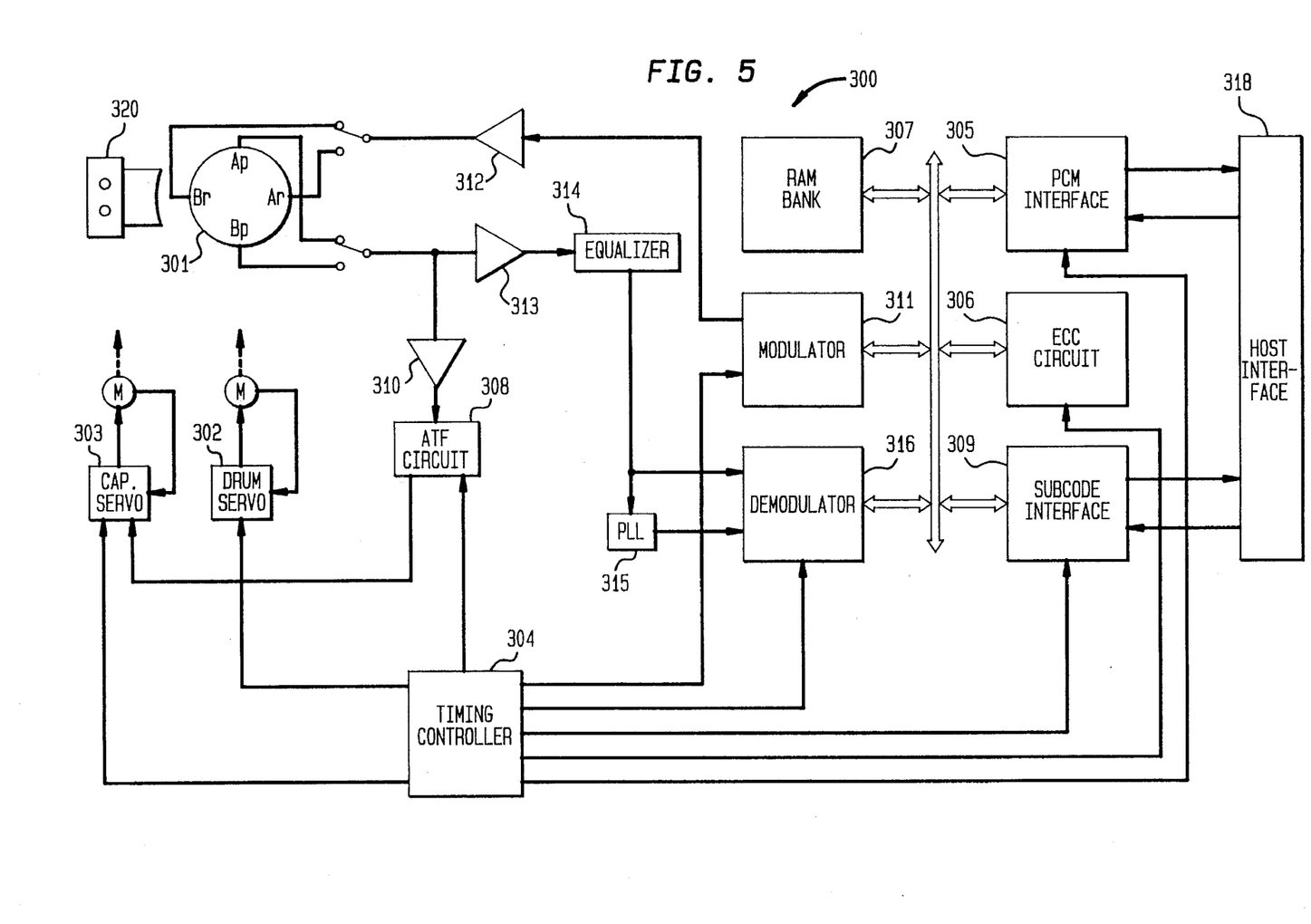
FIG. 5 illustrates a conventional R-DAT capable of performing a RAW operation.

FIG. 5 illustrates a conventional R-DAT 300 adapted for data storage. The R-DAT 300 has a timing generator 304 for synchronizing the operation of the R-DAT 300. As shown, the R-DAT 300 has four heads, two recording heads Ar, Br and two playback heads Ap, Bp. Each playback head Ap or Bp is positioned on the outer circumference of a rotating drum 301 270° (in the direction of rotation of the drum 301) from a respective recording head Ar or Br. During ordinary reproduction, a signal is reproduced from a track on a magnetic tape 320 partially wrapped around the rotating drum 301 via one of the playback heads Ap or Bp. The playback heads Ap and Bp convert magnetic signals on the tape to electrical signals which are amplified in the amplifiers 313 and 310. The amplified signal outputted from the amplifier 310 is inputted to an ATF circuit 308. The ATF circuit 308 outputs a tracking error signal to a capstan servo 303. The capstan servo 303, in turn controls the tracking in response to the tracking error signal. The capstan servo 303 controls a capstan motor in accordance with the frequency and phase information feedback from the capstan motor. Likewise, the drum servo 302 controls a drum motor in accordance with frequency and phase information feedback from the drum motor.

The signal outputted from the amplifier 313 is inputted to an equalizer 314. The signal outputted from the equalizer 314 is inputted to a PLL circuit 315. A signal outputted from the PLL circuit 315 and the signal outputted from the equalizer 314 are inputted to a demodulator circuit 316. The signal outputted from the equalizer 314 is organized into ten bit units. The demodulator circuit 316 demodulates the signal into eight bit units and performs a-parity check on the demodulated data. If thee demodulated data bytes pass the parity check, they are loaded into RAM bank 307.

Thereafter, the ECC circuit 306 performs error detection and correction on the data in the RAM bank 307. Afterwards, the PACK data bytes are outputted via the subcode interface 309 to a host interface 318. Illustratively, the host interface 318 interconnects the R-DAT 300 with a computer (such as the computer 10 of FIG. 1). In addition, the PCM data byte are inputted to a PCM interface 305 where the data bytes are de-interleaved. The de-interleaved PCM data bytes are then outputted to the host interface 318.

Illustratively, the R-DAT 300 records data using a RAW procedure. First, PCM data and PACK data from the host interface 318 are inputted to the PCM interface 305 and subcode interface 309, respectively. The PCM data bytes are interleaved in the PCM interface 305. The interleaved PCM data bytes and PACK data bytes are then combined and stored in the RAM bank 307. The combined data bytes are then ECC encoded by the ECC circuit 306. The encoded data (in eight bit form) are modulated into ten bit data units in the modulator 311 using an 8 to 10 conversion table. The signal in ten bit form is then outputted via the amplifier 312 to one of the recording heads Ar or Br. The recording head Ar or Br records a magnetic signal representing the data signal on the magnetic tape.

Figure 6:
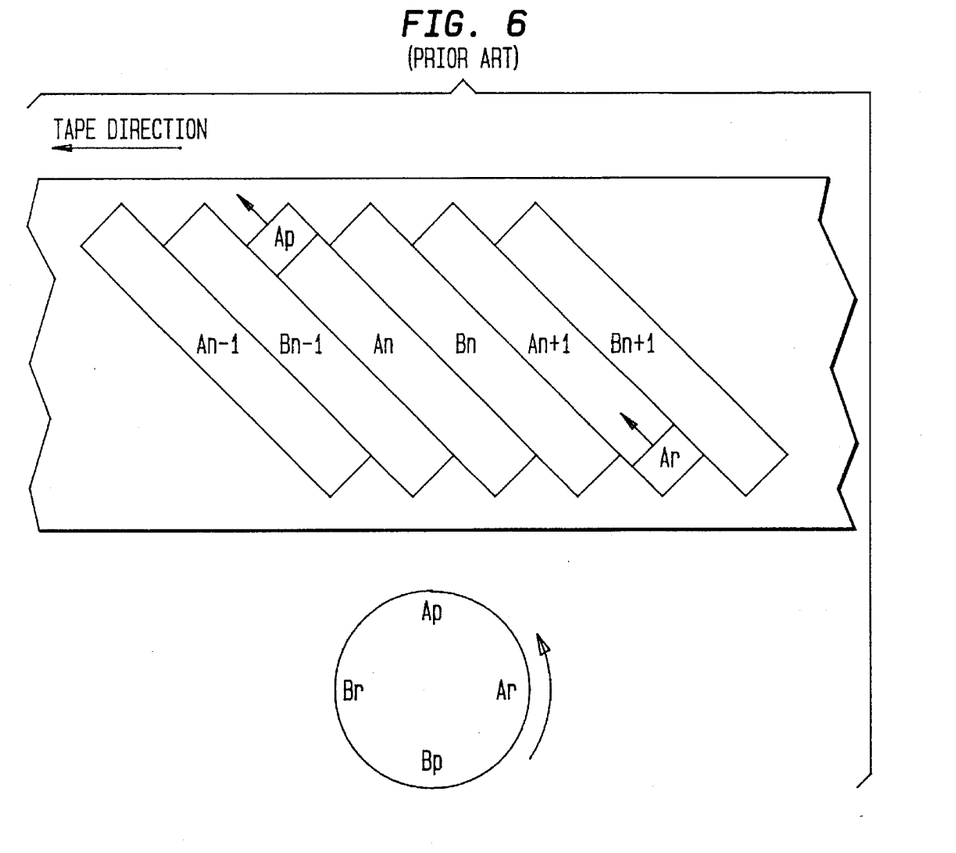
FIG. 6 illustrates the scan of the record and playback heads of the R-DAT shown in FIG. 5.

In the RAW process, after data bytes are recorded, the data bytes are reproduced for purposes of verifying that they were properly recorded. This is achieved as follows. Referring to FIG. 6, suppose the recording head Ar records a track of data $A_n$ on the tape. Some time T after the recording head Ar scans the track $A_n$ for purposes of recording, the playback head Ap scans the same track $A_n$ and reproduces the data stored thereon. As shown, the playback head Ap is positioned 270° of one rotation of the drum 301 from the recording head Ar and therefore scans the track $A_n$ immediately before the playback head Ap scans the next track $A_{n+1}$.

The reproduced data bytes are fed to the demodulator circuit 316 as before in ordinary reproduction. Therein, the demodulator circuit 316 performs a parity check on the data. Furthermore, the ECC circuit 306 performs an ECC check on the data. If the data bytes fail either check, the data bytes are re-recorded on the tape. Otherwise, the data bytes are considered valid and the recording head Ar records the next data (which is loaded in the RAM bank 307 and ECC encoded in parallel with reproducing the data from track $A_n$) on track $A_{n+1}$ of the tape.

The prior art RAW process of the R-DAT 300 is disadvantageous. The ECC and parity checks provide crude methods of error detection. Furthermore, the RAW process increases the load on the ECC circuit 306. Thus, an ECC circuit 306 must be provided with sufficient speed to both encode data to be recorded on one track and decode data reproduced from a previous track for verification purposes within the limited time constraints of the operation of the R-DAT. Moreover, even ECC decoding may fail to detect drop-in errors. This is because, the old pre-existing data which the R-DAT failed to record over may be error free despite being the incorrect data.

European Patent Application 0 297 809 discloses a non-RAW prior art process for detecting drop-in errors due to head clogging in a R-DAT used for data-storage. In this process, a portion of the PCM data of each track is allocated for storing header information. Each frame of data is assigned header information. When tracks of data are reproduced, the header information of each pair of reproduced tracks of each frame is compared. If the header information is not identical, a drop-in error is detected. This process provides limited drop-in error detection for detecting a single track which was not recorded over. However, little or no protection is provided if only a portion of a track (e.g., a SUB area) or a pair of tracks is not recorded over.

It is therefore an object of the present invention to overcome the disadvantages of the prior art.

SUMMARY OF THE INVENTION

This and other objects are achieved by the present invention which provides yet another form of error detection for use in RAW recording. In the inventive procedure, after a signal is recorded, it is temporarily maintained in a memory of the recording apparatus. When the signal is reproduced for purposes of validation, it is compared to the original copy in the memory of the tape recording apparatus. Based on differences between the original signal in the memory and the reproduced signal, the tape recording apparatus can determine whether or not the signal must be re-recorded on the tape. Illustratively, a reliability index is generated during the comparison step which indicates the ability to exactly reproduce the signal (e.g., in an ECC circuit using Reed Solomon coding) despite the existence of some errors therein.

According to one embodiment, a tape recorder apparatus is provided with a memory for storing a signal to be recorded on a tape. The tape recorder apparatus has a recording head for recording the signal stored in the memory. The tape recorder apparatus also has a playback head for reproducing the signal recorded by the recording head on the tape.

Furthermore, the tape recorder apparatus has a comparison circuit for comparing the signal reproduced by the playback head with the signal stored in the memory. Depending on errors identified by the comparison circuit in the reproduced signal, the signal in the memory is re-recorded on the tape.

Illustratively, the tape recorder apparatus is a R-DAT apparatus which records and reproduces digital signals on a magnetic tape. Although such a R-DAT apparatus according to the above embodiment could be used for a number of different applications, e.g., audio, it is particularly useful for data storage, e.g., in a computer system. This is because the invention can completely eliminate drop-in errors and also provide superior control of drop-out errors. Thus, the reliability of the data recorded on the tape is greatly increased.

BRIEF DESCRIPTION OF THE DRAWING

FIG. 4A and 4B illustrate a conventional interleaving of tracks.

DETAILED DESCRIPTION OF THE INVENTION

Figure 7:
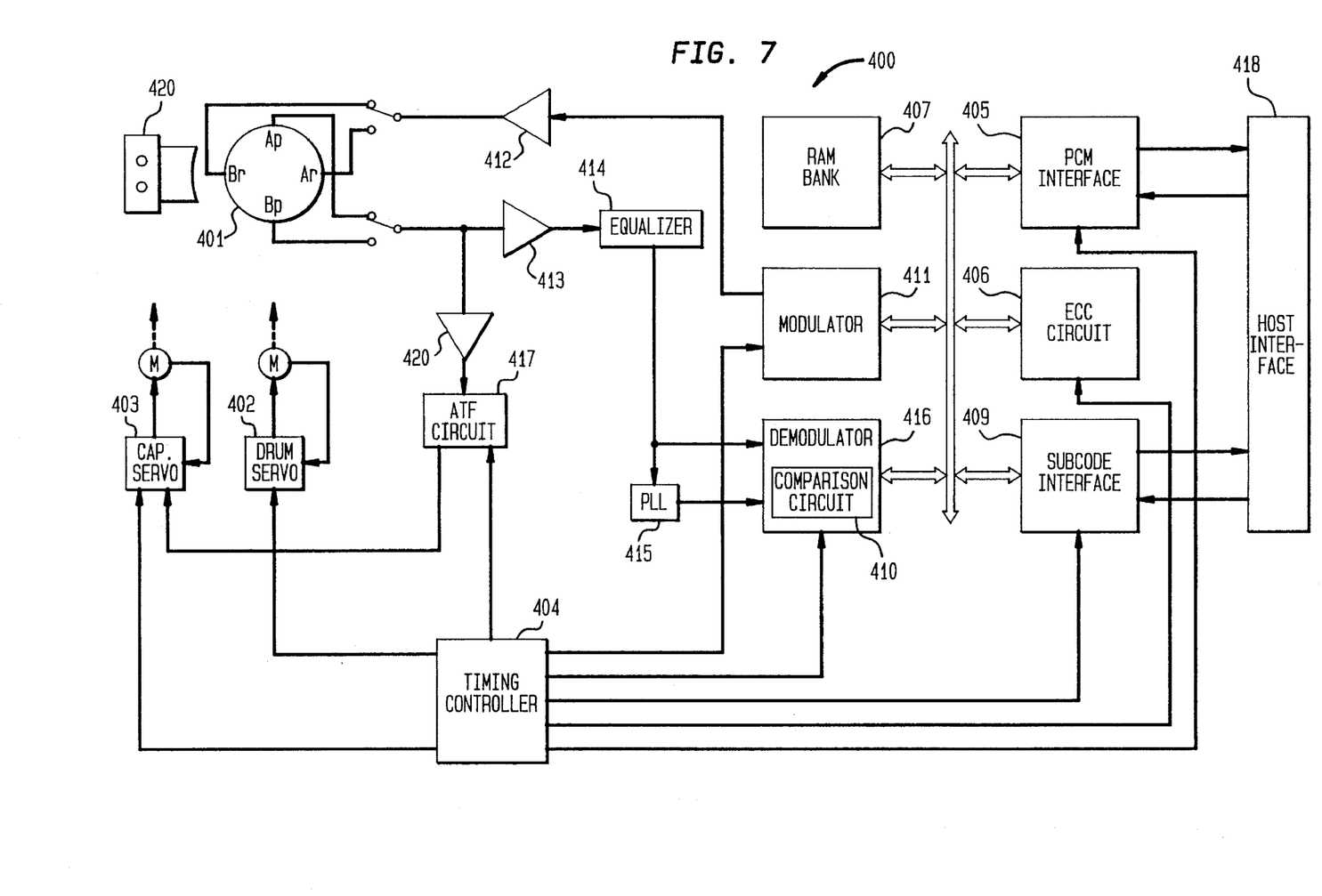
FIG. 7 illustrates a tape recorder apparatus according to the present invention.

FIG. 7 depicts a tape recorder apparatus 400 according to one embodiment of the present invention. Illustratively, the tape recorder apparatus 400 depicted in FIG. 7 is a R-DAT similar to the R-DAT shown in FIG. 5. For instance, the R-DAT 400 has a timing controller 404 for synchronizing the operation of the R-DAT 400. The R-DAT 400 also has a rotatable drum 401 with two record heads Ar, Br and two playback heads Ap, Bp. Signals generated by the record heads are inputted to amplifiers 413 and 420. A signal outputted by the amplifier 420 is inputted to an ATF circuit 417 which outputs a tracking error signal to a capstan servo 403. The signal outputted by the amplifier 413 is inputted to an equalizer 414. The output of the equalizer is fed directly, and via a PLL circuit 415, to a demodulator circuit 416.

A RAM bank 407 is provided which is accessible by a modulator 411, the demodulator 416, a subcode interface 409, an ECC circuit 406 and a PCM interface 405. In addition, the timing controller 404 outputs an appropriate timing signal to the demodulator 416, modulator 411, PCM interface 405, ECC circuit 406 and subcode interface 409.

Both the PCM interface 405 and subcode interface 409 are connected to a host interface 418. The modulator 411 outputs a signal to the recording heads Ar, Br via the amplifier 412.

The R-DAT apparatus 400 is different from the prior art R-DAT apparatus 300 (FIG. 5) in that the demodulator circuit 416 includes a data comparison circuit 410. The data comparison circuit 410 is capable of comparing each byte of data demodulated by the demodulator 416 with its corresponding original copy in the RAM bank 407. Illustratively, the comparison circuit 410 performs a bit-wise exclusives NOR operation (or equivalence operation) on the reproduced data and the original data in the RAM bank 407. Essentially, the comparison circuit 410 determines if there are any differences between the demodulated data and its original copy in the RAM bank 407. Each difference indicates an error in the reproduced signal. Based on these differences, the comparison circuit 410 generates a reliability index. The generated reliability index may depend on the R-DAT's 400 ability to reconstruct the data during ordinary reproduction (i.e., using ECC decoding). The reliability index is communicated to the host interface 418 which determines whether the data bytes are valid or must be re-recorded.

Figure 8:
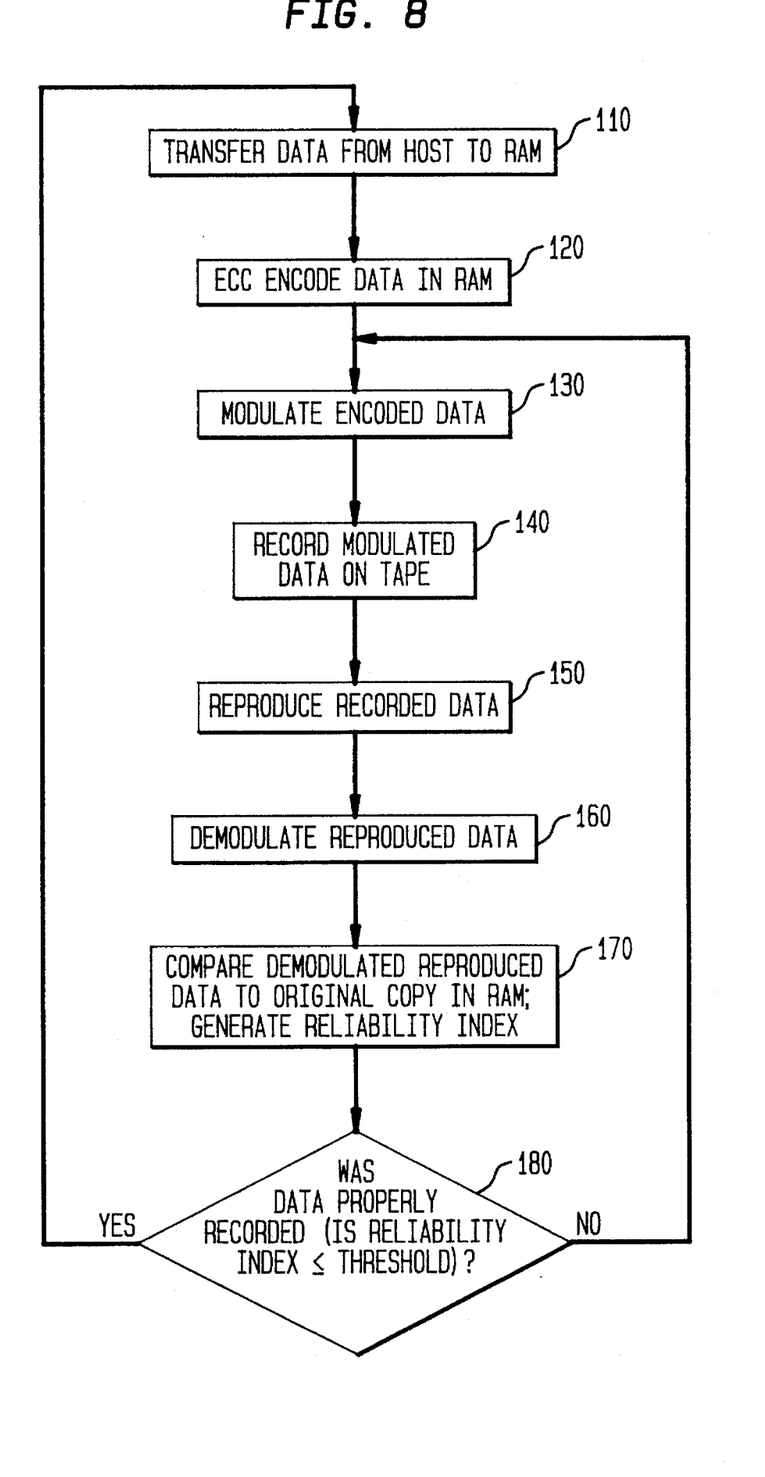
FIG. 8 schematically illustrates a flow chart of a recording process carried out according to an embodiment of the present invention.

FIG. 8 is a flow-chart which schematically illustrates a RAW recording process according to an embodiment of the present invention. Illustratively, the RAW recording process of FIG. 8 can be performed by the R-DAT 400 of FIG. 7.

In a first step 110, the host interface 418 transfers data to be recorded into the RAM bank 407 via the PCM interface 405 and subcode interface 406. In step 120, the data bytes are encoded in the ECC circuit 406. In step 130, the encoded data bytes are eight to ten bit modulated in the modulator 411 and outputted to one of the recording heads, e.g., the recording head Ar, via the amplifier 412. However, the original unmodulated data bytes are not erased or overwritten in the RAM bank 407. Rather, the original data bytes are temporarily maintained in the RAM bank 407. The recording head Ar records the modulated data on the tape in step 140.

Figure 9:
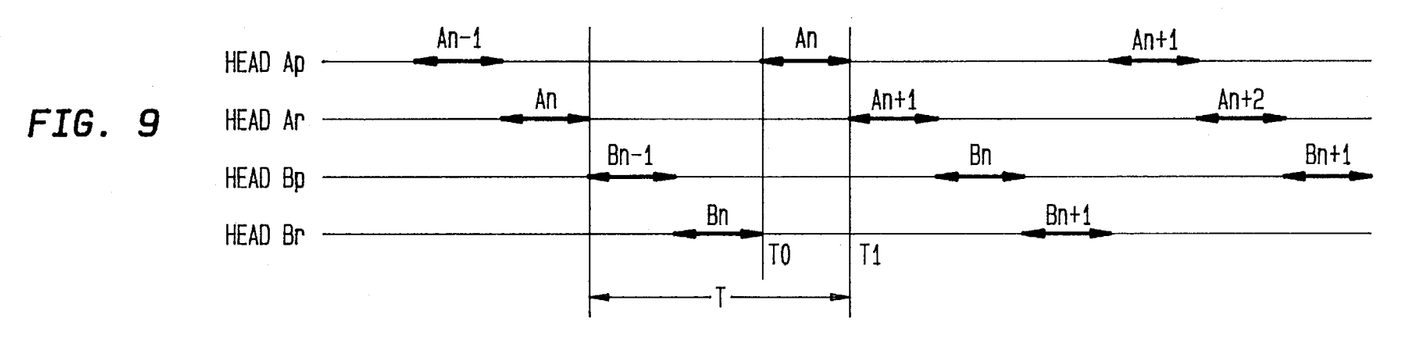
FIG. 9 illustrates the timing of the scan of the record and playback heads of the tape recorder apparatus shown in FIG. 7.

In step 150, the playback head Ap reproduces from the tape the data recorded on the tape by the recording head Ar. As shown in FIG. 9, the playback head Ap illustratively scans each track (e.g., the track $A_n$) a time period T after the recording head Ar records data on the track $A_n$. As shown, the time period T corresponds to the time elapsed during a 270° rotation of the drum 401.

In step 160 the reproduced data bytes are is demodulated into eight bit form in the demodulator circuit 416. In step 170, the comparison circuit 410 compares the demodulated data with the original copy of the data stored in the RAM bank 407. Based on errors in the reproduced signal, i.e., differences between the demodulated data reproduced from the tape and the original copy of the data, the comparison circuit 410 generates a reliability index of the data reproduced from the tape. In step 180, the host interface 418 receives the reliability index and determines whether or not the data bytes were properly recorded on the tape. Essentially, the host interface 418 judges whether or not the data could be reconstructed (with provisions for the later occurrence of drop-out which may occur over time or by repeated use of the tape). For example, the host interface may use a predetermined threshold reliability constant. In such a case, the host interface compares the reliability index to the threshold reliability, constant. If the reliability index exceeds the threshold, the data is rejected. If the reliability index is equal to or below the threshold, the data bytes are accepted.

Figure 10A:
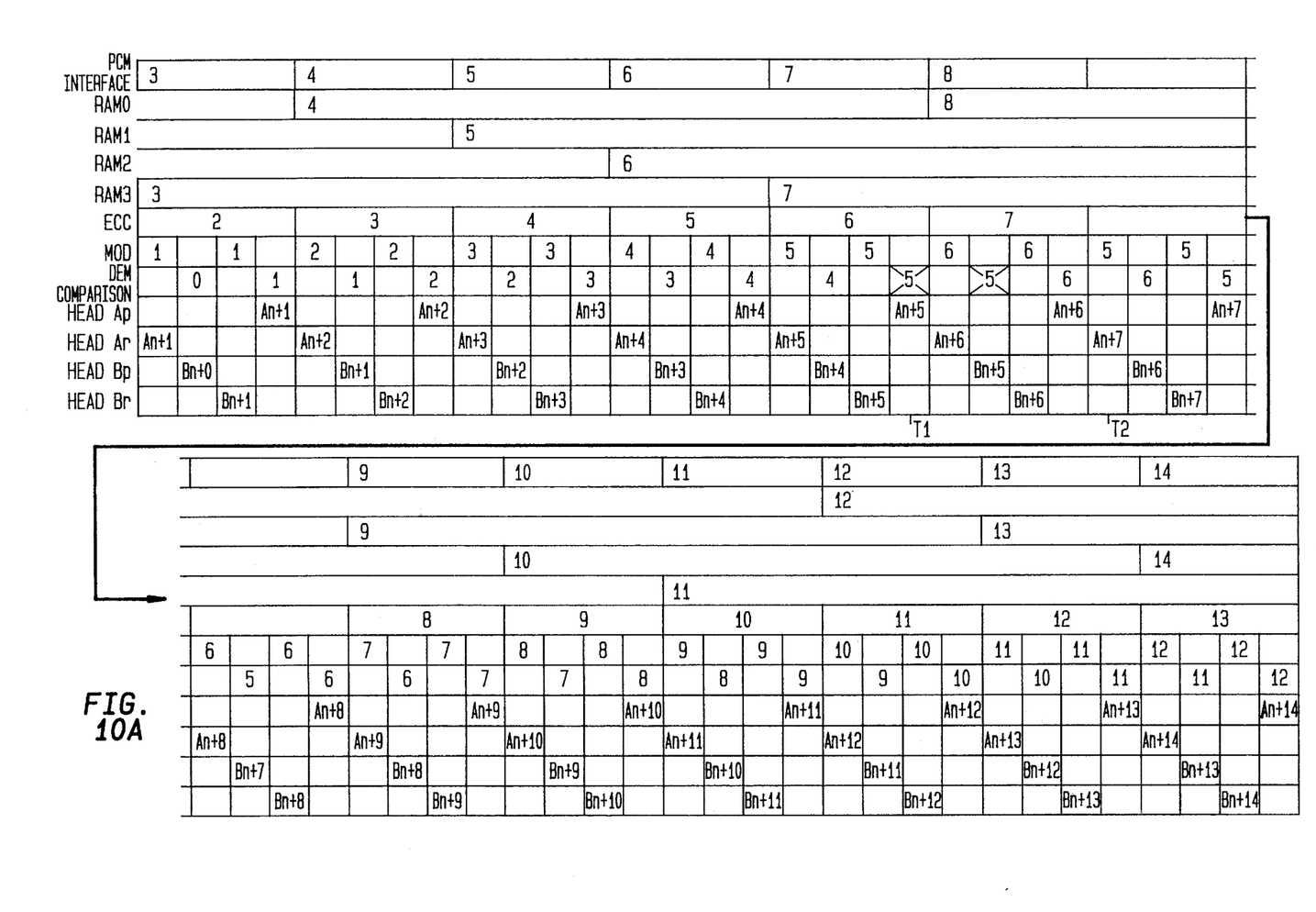
FIG. 10A, 10B and 10C illustrate the re-recording of frames in the event of an error according to the present invention.
Figure 10B:
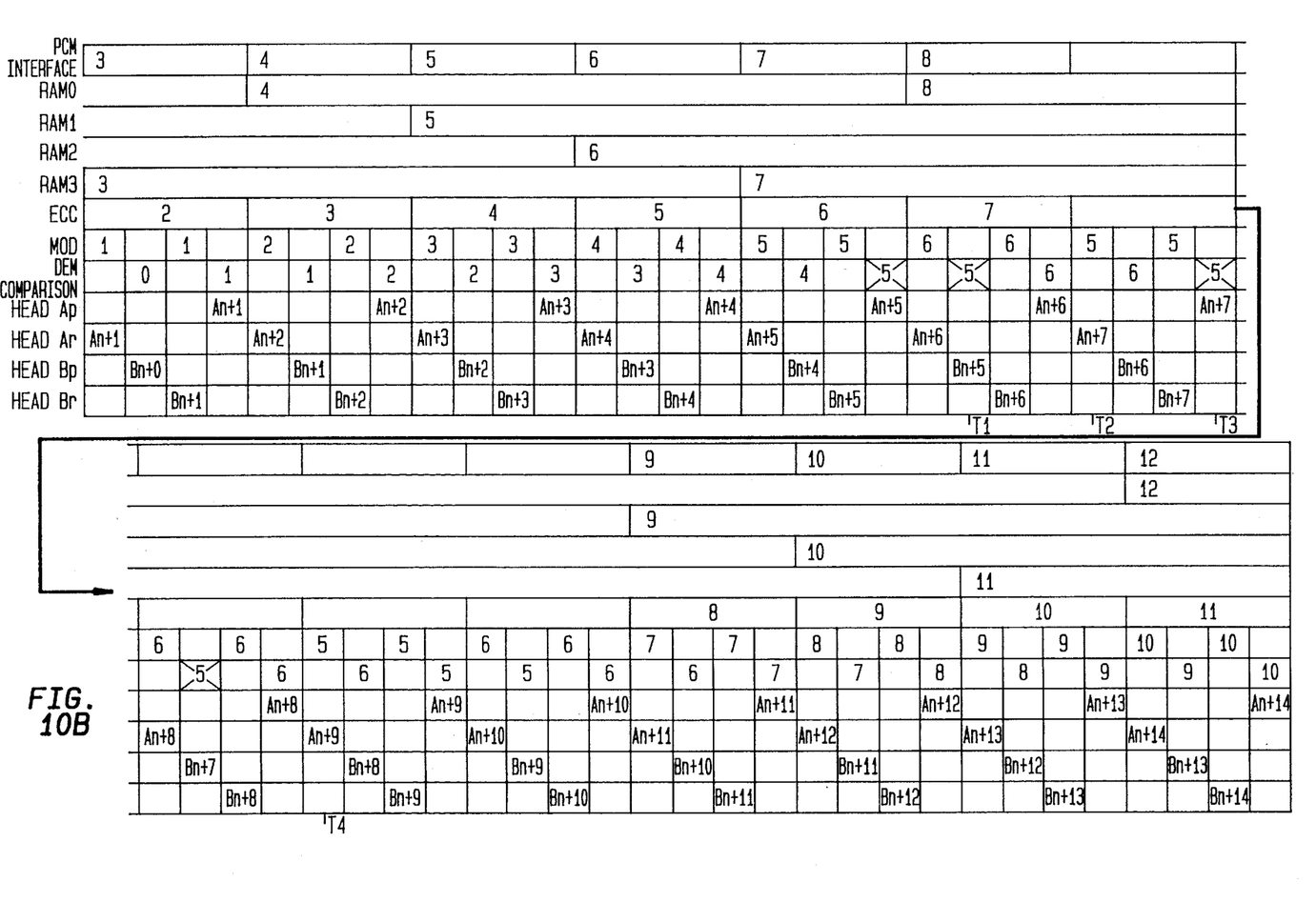
Figure 10C:
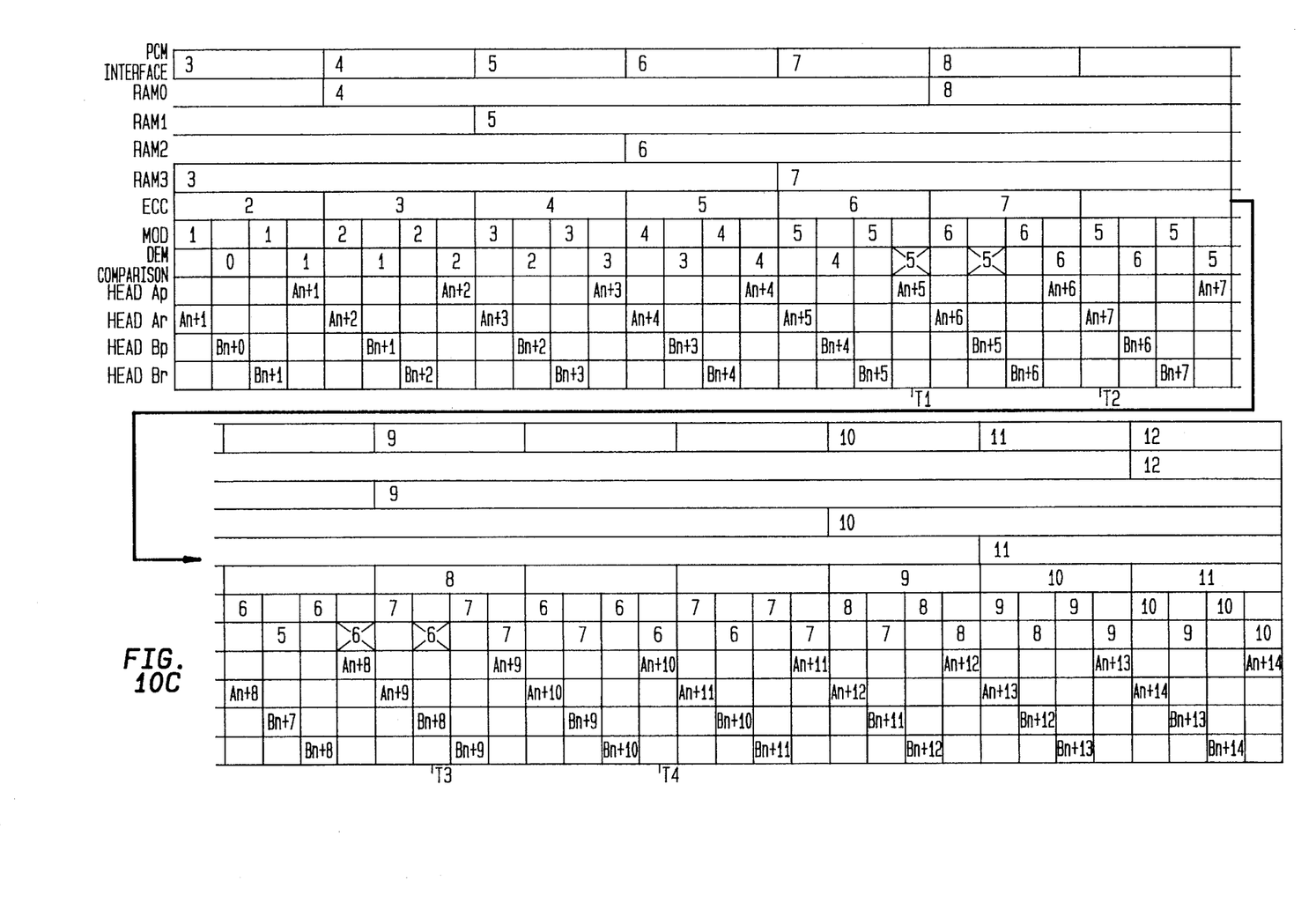

In the case the data bytes are rejected, execution branches to step 130. This causes the data to be re-recorded on the tape. Illustratively, the comparison steps 170–180 are performed with sufficient speed such that the data may be re-recorded (if necessary) by the recording head Ar on the track $A_{n+2}$ (see FIG. 9). Illustratively, on account of the interleaving format (shown in FIGS. 4A and 4B), the data bytes of one frame are recorded in an interleaved fashion on a pair of tracks A and B. If either one (or both) or the track pairs is rejected, both tracks must be re-recorded. This is better illustrated in FIGS. 10A, 10B and 10C. In FIG. 10A, the demodulator circuit 416 detects an error in the recently recorded frame five at time $T_1$. Thus, frame 5 is re-recorded at time $T_2$ followed by frames 6, 7, 8 ... Note that frame 6 is re-recorded even though no error was detected therein. In FIG. 10B, the demodulator circuit 416 detects an error in frame 5 at $T_1$. Frames 5 and 6 are thus re-recorded at $T_2$. The demodulator then detects an error in the second recording of frame 5 at time $T_3$. Thus, frames 5 and 6 are re-recorded at time $T_4$. FIG. 10C shows a scenario wherein an error is detected at time $T_1$ in the first recording of frame 5 prompting a re-recording from frame 5 at time $T_2$. Then, at time $T_3$ an error is detected in the second recording of frame 6 prompting a re-recording from frame 6 at time $T_4$.

In the case the data bytes are not rejected, execution branches to the step 110. Thus, the next data bytes to be recorded are loaded into the RAM bank 407. Alternatively, the next data may have already been loaded into the RAM bank 407 and ECC encoded in which case the next data bytes are simply recorded on the tape. The RAW process of FIG. 8 is repeated as necessary to record all of the data to be recorded or re-recorded.

In the above RAW-process, data reproduced from the tape after recording are compared to the original copy of the data stored in the RAM bank. This enables the R-DAT 400 to ensure that the data bytes are initially stored with 100% accuracy (i.e., completely error free) if desired. More importantly, the R-DAT 400 can ensure that the reproduced data bytes are in fact the data bytes which were intended to be recorded on the tape and not old, pre-existing data on the tape. In other words, the above RAW process detects drop-in errors. Again, this is possible because the reproduced data bytes are not "self" tested solely using error detection information contained in reproduced data. Rather, the reproduced data bytes are compared to the original copy of that data stored in the RAM bank 407. Thus, if an old pre-existing data bytes which are otherwise error free are reproduced, they will be detected as erroneous when compared to the original copy of the data bytes stored in the RAM bank 407.

In short, a tape recording apparatus and method of recording signals is disclosed. The apparatus includes a memory, a recording head, a playback head and a comparison circuit. The recording head is for recording a signal stored in the memory on a tape. The playback head is for reproducing the recorded signal. The comparison circuit is for comparing the signal reproduced by the playback head with the signal stored in the memory. Depending on the number of differences between the reproduced signal and the signal stored in the memory, the recording head re-records on the tape the signal in the memory. The inventive apparatus and method provide superior error detection in recording including the ability to detect both dropout and drop-in errors.

Finally, the invention has been described above with reference to specific embodiments. However, this was merely illustrative. Numerous other embodiments may be devised by those having ordinary skill in the art without departing from the spirit and scope of the following claims.

The claimed invention is:

1. In a tape recording apparatus, comprising a memory and first and second pairs of recording and reproducing heads positioned on a rotary drum so that each reproducing head scans a track recorded by the recording head of the respective pair after both the first and second recording heads record tracks, a method for recording a signal on a tape comprising the steps of:

(a) interleaving data to be recorded onto pairs of signals;

(b) sequentially recording each of first and second signals of a first pair of signals stored in said memory on respective consecutive adjacent tracks of said tape by scanning said first and second recording heads of said tape recording apparatus sequentially, over said consecutive adjacent tracks of said tape;

(c) after recording said first pair of signals in step (b), sequentially recording each of third and fourth signals of a second pair of signals stored in said memory on respective consecutive adjacent tracks of said tape adjacent to said track on which said second signal of said first pair of signals was recorded, said third and fourth signals succeeding said first pair of signals;

(d) while recording said second pair of signals in step (c), sequentially reproducing said first and second signals from said respective tracks of said tape by scanning said first and second reproducing heads of said recording apparatus sequentially over said consecutive adjacent tracks of said tape on which said first and second signals are recorded;

(e) comparing said reproduced first and second signals to corresponding first and second signals stored in said memory;

(f) in response to detecting errors in step (e) in either of said first and second reproduced signals, completing said recording of said second pair of signals and repeating steps (a)–(e) for said first and second pairs of signals, wherein said first and second pairs of signals are re-recorded on respective consecutive adjacent tracks of said tape adjacent to said track in which said fourth signal of said second pair of signals was most recently recorded; and (g) if no error is detected in step (e), repeating steps (c)–(g) for subsequent consecutive pairs of signals, wherein said re-recording of pairs of signals in step (f) re-records said pairs of signals on consecutive adjacent tracks beginning with the pair in which said errors were detected and continuing in sequence therefrom, regardless of in which signal, of said pair of signals containing said errors, said errors were detected, to preserve a sequence of said interleaving of data within each pair of signals of step (a).

2. The method of claim 1 wherein step (e) of comparing further comprises the step of determining differences between said first and second reproduced signals and said corresponding first and second signals stored in said memory.

3. The method of claim 1 wherein said signals stored in said memory and said signals reproduced from said tape are digital signals.

4. The method of claim 1 wherein step (e) of comparing further comprises the step of exclusive-nor'ing said first and second reproduced signals with said corresponding first and second signals stored in said memory.

5. The method of claim 1 further comprising the step of generating a reliability index based on the occurrence of errors in said reproduced first and second signals, wherein said first and second signals are re-recorded if said generated reliability index exceeds a threshold.

6. The method of claim 5 wherein said generated reliability index depends on the ability of said tape recording apparatus to accurately reproduce said first and second signals from said tape.

7. The method of claim 1 wherein step (b) of recording comprises the step of rotating said first recording head of said tape recording apparatus to scan a first track of said tape, wherein said step (d) of reproducing comprises the step of rotating said first playback head of said tape recording apparatus to scan said first track of said tape, and wherein step (f) of re-recording comprises rotating said second recording head of said tape recording apparatus to scan a second track of said tape.

8. A tape recording apparatus comprising:
   a memory for storing data which is interleaved onto pairs of signals to be recorded on a tape,
   first and second pairs of recording and reproducing heads positioned on a rotary drum so that each reproducing head scans a track recorded by the recording head of the respective pair after both the first and second recording heads record tracks,
   wherein said first and second recording heads sequentially record each of first and second signals of a first pair of signals and each of third and fourth signals of a second pair of signals stored in said memory on respective consecutive adjacent tracks of said tape, said first and second recording heads recording said interleaved data such that said first and second signals are interleaved onto first and second tracks and said third and fourth are interleaved onto third and fourth tracks, said first, second, third and fourth tracks being sequentially positioned on said tape,
   and wherein said first and second playback heads reproduce said signals recorded on said tape by said first and second recording heads while said first and second recording heads record said third and fourth signals,
   a comparison circuit for comparing said first and second signals reproduced by said first and second playback heads with said first and second signals stored in said memory, and
   a host interface for causing said first and second recording heads to re-record said first and second signals stored in said memory if an output of said comparison circuit indicates errors, wherein said host interface causes said first and second recording heads to re-record said first and second signals beginning with the pair in which said errors were detected and continuing in sequence therefrom, regardless of in which signal thereof said errors were detected, to preserve a sequence of said interleaving of data within each pair of signals.

9. The apparatus of claim 8 wherein depending on errors in said reproduced signal detected by said comparison circuit, said first and second recording heads re-records on said tape said signal stored in said memory.

10. The apparatus of claim 8 wherein said comparison circuit determines differences between said reproduced first and second signals and said first and second signals stored in said memory.

11. The apparatus of claim 8 wherein said first and second signal stored in said memory and said first and second signal reproduced from said tape are digital signals.

12. The apparatus of claim 8 wherein said comparison circuit exclusive-nor's said first and second reproduced signals with said first and second signals stored in said memory.

13. The apparatus of claim 8 wherein said comparison circuit generates a reliability index based on the occurrence of errors in said first and second reproduced signals, wherein said first and second signals are re-recorded if said generated reliability index exceeds a threshold.

14. The apparatus of claim 13 wherein said generated reliability index depends on the ability of said tape recording apparatus to accurately reproduce said first and second signal from said tape.

15. The apparatus of claim 8 wherein said first and second signals are recorded on said first and second tracks formed on said tape obliquely to a longitudinal direction of said tape, wherein said first and second recording heads and said first and second playback heads are disposed on the outer circumference of said rotating drum, and wherein said drum rotates said record and playback heads such that said playback head scans said track of said tape scanned by said first and second recording heads so as to reproduce said first and second signals recorded by said first and second recording heads on said first and second tracks.

16. A computer system comprising:
   a processor, and
   a tape recording apparatus connected to said processor via a data bus comprising:
   a memory for storing first and second signals of first and second pairs of signals
   a rotary head comprising first and second pairs of recording and playback heads positioned on said rotary head so that each playback head,scans a track recorded by the recording head of the respective pair after both the first and second recording heads record tracks,
   a comparison circuit for comparing first and second signals of said first pair of signals reproduced by the first and second playback heads to said first and second signals of said first pair of signals stored in said memory, and
   a host interface for causing the first and second recording heads to re-record said pairs of signals if an output of said comparison circuit indicates an error in either of said reproduced first and second signals, wherein the host interface causes to re-record said pairs of signals containing said error on consecutive tracks beginning with said pair in which said error was detected and continuing in sequence therefrom, regardless of in which signal said error was detected, to preserve a sequence of said interleaved of data within each pair of signals.

17. The method of claim 1 wherein step (f) of re-recording re-records both tracks of said pair of tracks in response to detecting said error on only a single one of said pair of tracks.

18. The method of claim 1 wherein step (e) of comparing comprises the step of bit-wise exclusive-noring said reproduced signal with said signal stored in said memory.

19. In a tape recording apparatus comprising a memory, a method for recording a signal comprising the steps of:
   (a) interleaving data to be recorded onto pairs of signals;
   (b) sequentially recording each of first and second signals of a current pair of signals stored in said memory on respective consecutive adjacent tracks of said tape by scanning said first and second recording heads of said tape recording apparatus sequentially, over said consecutive adjacent tracks of said tape;
   (c) after recording said current pair of signals in step (b), sequentially recording each of third and fourth signals of a next pair of signals stored in said memory on respective consecutive adjacent tracks of said tape adjacent to said track on which said second signal of said current pair of signals was recorded, said third and fourth signals of said next pair of signals succeeding said current pair of signals;

(d) while recording said next pair of signals in step (c), sequentially reproducing said first and second signals of said current pair of signals from said respective tracks of said tape by scanning said first and second reproducing heads of said recording apparatus sequentially over said consecutive adjacent tracks of said tape on which said first and second signals are recorded;

(e) comparing said reproduced first and second signals to corresponding first and second signals stored in said memory;

(f) in response to detecting an error in step (e) in either of said first and second reproduced signals, completing said recording of said next pair of signals and repeating steps (a)–(e) for said current and next pairs of signals, wherein said current and next pairs of signals are re-recorded on respective consecutive adjacent tracks of said tape adjacent to said track in which said fourth signal of said next pair of signals was most recently recorded; and (g) if no error is detected in step (e), repeating steps (c)–(g) for subsequent consecutive pairs of signals, wherein said re-recording of pairs of signals in step (f) re-records said current and next pairs of signals on consecutive adjacent tracks beginning with said current pair in which said error was detected and continuing in sequence therefrom, to preserve a sequence of said interleaving of data within each pair of signals of step (a).

* * * * *